United States Patent
Hara et al.

(10) Patent No.: US 9,667,153 B2
(45) Date of Patent: May 30, 2017

(54) SWITCHING POWER SUPPLY APPARATUS FOR GENERATING CONTROL SIGNAL FOR LOWERING SWITCHING FREQUENCY OF SWITCHING DEVICES

(71) Applicant: Panasonic Intellectual Property Management Co., Ltd., Osaka (JP)

(72) Inventors: Shoichi Hara, Osaka (JP); Kazuyuki Sakiyama, Osaka (JP); Akira Minegishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/785,530

(22) PCT Filed: May 27, 2014

(86) PCT No.: PCT/JP2014/002790
§ 371 (c)(1),
(2) Date: Oct. 19, 2015

(87) PCT Pub. No.: WO2014/192290
PCT Pub. Date: Dec. 4, 2014

(65) Prior Publication Data
US 2016/0099649 A1    Apr. 7, 2016

(30) Foreign Application Priority Data

May 30, 2013   (JP) ................................. 2013-114221

(51) Int. Cl.
*H02M 3/335*   (2006.01)
*B60L 11/18*   (2006.01)
*H02M 1/00*    (2006.01)

(52) U.S. Cl.
CPC ..... *H02M 3/33507* (2013.01); *B60L 11/1811* (2013.01); *H02M 3/3353* (2013.01);
(Continued)

(58) Field of Classification Search
CPC ........... H02M 3/33507; H02M 3/3353; H02M 2001/0032; H02M 2001/0058; B60L 11/1811; Y02B 70/1491; Y02B 70/16
(Continued)

(56) References Cited

U.S. PATENT DOCUMENTS 7,859,864 B2   12/2010  Shiroyama
8,542,500 B2 *  9/2013  Guan ................... H02M 3/156
                                                       363/21.02
(Continued)

FOREIGN PATENT DOCUMENTS

JP   03-251079   11/1991
JP   06-141541    5/1994
(Continued)

OTHER PUBLICATIONS

Received search report from EIC 2800 STIC searcher Benjamin Martin on Sep. 6, 2016.*
(Continued)

*Primary Examiner* — Gary L Laxton
*Assistant Examiner* — Htet Z Kyaw
(74) *Attorney, Agent, or Firm* — Wenderoth, Lind & Ponack, L.L.P.

(57) ABSTRACT

A switching power supply apparatus includes: an DC/AC converter unit for converting a DC voltage to an AC voltage based on switching operation of switching devices; a transformer for converting the AC voltage to an AC voltage having a voltage value; a resonance circuit provided between the DC/AC converter unit and the transformer; an AC/DC converter circuit for converting an AC voltage from
(Continued)

the transformer to a DC; an output detector unit for detecting an output voltage or an output current of the apparatus; a duty ratio controller unit for controlling a duty ratio of switching of the apparatus such that a detected output voltage or current becomes a target value; an energy detector unit for detecting an energy accumulated in the resonance circuit; and a controller unit for controlling a switching frequency such that a detected energy becomes a threshold value.

5 Claims, 9 Drawing Sheets

(52) U.S. Cl.
CPC ............... *H02M 2001/0032* (2013.01); *H02M 2001/0058* (2013.01); *Y02B 70/1491* (2013.01); *Y02B 70/16* (2013.01)

(58) Field of Classification Search
USPC ..................................... 363/17, 21.02, 21.03
See application file for complete search history.

(56) References Cited

U.S. PATENT DOCUMENTS 9,570,993 B2 * 2/2017 Takahara ............ H02M 3/3376
2002/0011602 A1 * 1/2002 Nishida ............... H02M 3/3385 257/107
2006/0126364 A1 * 6/2006 Yasumura ........... H02M 3/3385 363/16
2009/0134859 A1 5/2009 Shiroyama
2009/0196080 A1 * 8/2009 Zhang ............... H02M 3/33507 363/74
2010/0220500 A1 * 9/2010 Mino ...................... H02M 1/32 363/17
2016/0248347 A1 * 8/2016 Shinohara ................ H02P 3/12

FOREIGN PATENT DOCUMENTS

| | | |
|---|---|---|
| JP | 2002-238257 | 8/2002 |
| JP | 2002-252975 | 9/2002 |
| JP | 2006-042435 | 2/2006 |
| JP | 2008-022658 | 4/2008 |
| JP | 2008-278723 | 11/2008 |
| JP | 2009-153364 | 7/2009 |

OTHER PUBLICATIONS

International Search Report issued Jul. 29, 2014 in International (PCT) Application No. PCT/JP2014/002790.
International Preliminary Report on Patentability and Written Opinion of the International Searching Authority mailed Dec. 10, 2015 in International (PCT) Application No. PCT/JP2014/002790.

* cited by examiner

SWITCHING POWER SUPPLY APPARATUS FOR GENERATING CONTROL SIGNAL FOR LOWERING SWITCHING FREQUENCY OF SWITCHING DEVICES

TECHNICAL FIELD

The present disclosure is related to, for example, a switching power supply apparatus such as a DC/DC converter. In particular, the present disclosure is related to a switching power supply apparatus such as an insulated DC/DC converter, where the insulated DC/DC converter is configured by including a full-bridge inverter connected with a primary winding of a transformer, and a rectifier circuit connected with a secondary winding of the transformer.

BACKGROUND ART

In recent years, in order to suppress electromagnetic induction noise generated by an electric apparatus and to reduce a switching loss of switching devices, studies of low loss and low noise have been done to which soft switching techniques for performing zero voltage switching (ZVS) or zero current switching (ZCS) on switching devices are applied. Even in a DC/DC converter, the soft switching technology is applied, and characteristics of the DC/DC converter have been improved.

As an example of circuit system of the DC/DC converter to which the soft switching is applied, there is a phase shift PWM (Pulse Width Modulation) control method. A conventional example of phase-shift PWM controlled DC/DC converter to which the soft switching is applied is disclosed, for example, in Patent Document 1.

PRIOR ART DOCUMENTS

Patent Document

Patent Document 1: Japanese patent laid-open publication No. JP 2002-238257 A.

Problems to be Solved by the Invention

However, when the load is light and the output current is small, the conventional method also decreases a current flowing in a resonance coil connected in series to a high-frequency transformer, and then, it is not possible to accumulate enough energy to complete charging and discharging of four capacitors which are connected in parallel to respective switching devices of a full-bridge inverter circuit, and soft switching operation cannot be performed. As a result, this leads to such problems as degradation in the efficiency and increase in the noise level.

One non-limiting and exemplary embodiment provides a switching power supply apparatus being capable of suppressing reduction of the efficiency and increase in the noise level even in a light output load.

Means for Dissolving the Problems

According to the present disclosure, there is provided a switching power supply apparatus including an DC/AC converter unit, a transformer, a resonance circuit, a resonance circuit, an AC/DC converter circuit, an output detector unit, a duty ratio controller unit, an energy detector unit, and a controller. The DC/AC converter unit is configured to convert a DC voltage to an AC voltage based on switching operation of switching devices, and the transformer is configured to convert the AC voltage to an AC voltage having a predetermined voltage value. The resonance circuit is provided between the DC/AC converter unit and the transformer, and the AC/DC converter circuit is configured to convert an AC voltage from the transformer to a DC. The output detector unit is configured to detect an output voltage or an output current of the switching power supply apparatus, and the duty ratio controller unit is configured to control a duty ratio of switching of the switching power supply apparatus such that a detected output voltage or a detected output current becomes a predetermined target value. The energy detector unit is configured to detect an energy accumulated in the resonance circuit, and the controller unit is configured to control a switching frequency of the switching power supply apparatus such that a detected energy becomes a predetermined threshold value. The controller unit controls a switching frequency of the switching devices to lower the switching frequency such that the current or the voltage of the resonance circuit reaches the threshold value when the current or the voltage detected by the energy detector unit becomes equal to or smaller than a predetermined threshold value.

Effects of the Invention

According to the present disclosure, it is possible to suppress lowering of the efficiency and increase in the noise level at the time of light load operation.

DETAILED DESCRIPTION OF THE EMBODIMENTS

Hereinafter, embodiments of the present disclosures will be described with reference to the accompanying drawings.

In the following embodiments, like components are denoted by the same reference numerals.

Comparative Example

Figure 5:
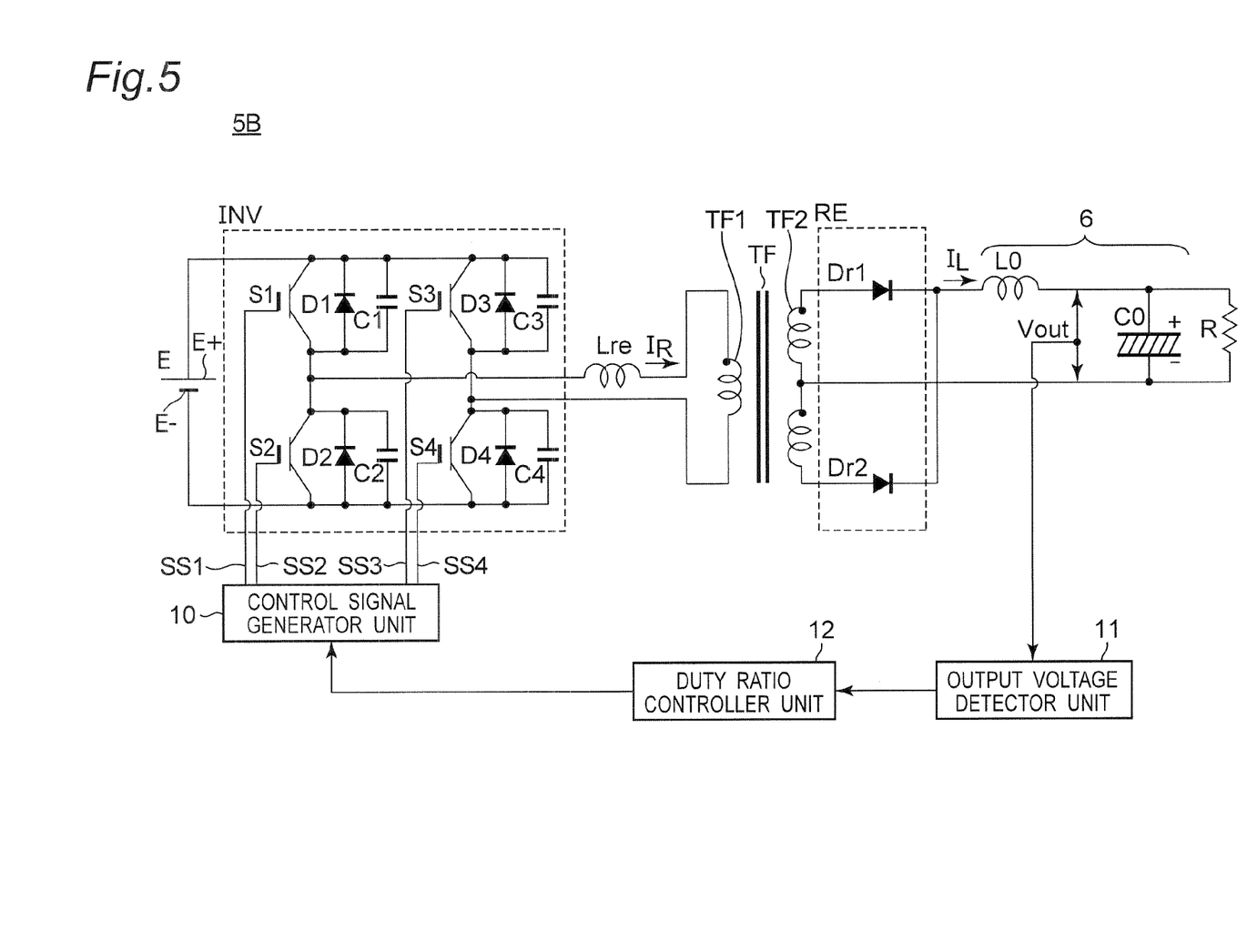
FIG. 5 is a circuit diagram showing a configuration of a phase shift DC/DC converter 5B according to a comparative example.

FIG. 5 is a circuit diagram showing a configuration of a phase shift DC/DC converter 5B according to a comparative example. The phase shift DC/DC converter 5B of FIG. 5 is configured to by including: a high-frequency transformer TF configuring a transformer; a resonance coil Lre disposed on a primary winding TF1 side of the frequency transformer TF; a full-bridge inverter circuit INV including semiconductor switching devices (referred to as switching devices hereinafter) S1, S2, S3 and S4 provided between the resonance coil Lre and a DC (Direct Current) power supply E; a rectifier circuit RE disposed on a secondary winding TF2 side of the high-frequency transformer TF; and a smoothing filter circuit 6 including an output reactor L0 and an output capacitor C0 which are disposed between the rectifier circuit RE and a load resistor R. In addition, the DC/DC converter 5B includes: an output voltage detector unit 11 for detecting an output voltage Vout across the load resistor R; a duty ratio controller unit 12 for controlling a time ratio or a duty ratio of switching performed by the DC/DC converter 5B based on the detected output voltage Vout; and a control signal generator unit 10 for generating and applying control signals SS1 to SS4 which are control pulse signals for the switching devices S1 to S4 of the full-bridge inverter circuit INV based on the controlled duty ratio. In this case, the control signal generator unit 10 is configured by a digital computer such as a microcomputer.

In FIG. 5, a winding start of each of the windings TF1 and TF2 of the high-frequency transformer TF is indicated by ".". As each of the switching devices S1 to S4, for example, a semiconductor switching device such as a MOSFET or an IGBT is used.

Referring to FIG. 5, the full-bridge inverter circuit INV is configured to by including: the switching devices S1 to S4 which are connected in a full-bridge form; and reverse conducting diodes D1, D2, D3 and D4 and snubber capacitors C1, C2, C3 and C4, which are respectively connected in parallel to the switching devices S1, S2, S3 and S4. The full-bridge inverter circuit INV converts a DC (Direct Current) voltage from the DC voltage supply E, to an AC (Alternating Current) voltage by a phase-shift control method, and outputs the converted AC voltage. In this case, the switching devices S1 and S2 configure a reference phase leg, and the switching devices S3 and S4 configure a control phase leg. The full-bridge inverter circuit INV converts the DC voltage from the DC voltage supply E to the AC voltage by switching the DC voltage, and then, outputs AC voltage to the primary winding TF1 of the high-frequency transformer TF through the resonance coil Lre connected in series to the primary winding TF1 of the high-frequency transformer TF. In addition, the rectifier circuit RE configures an AC/DC converter circuit by including rectifying diodes Dr1 and Dr2. The rectifier circuit RE is connected to the secondary winding TF2 of the high-frequency transformer TF, and full-wave-rectifies the AC voltage to a DC voltage to output the DC voltage to the load resistor R via the smoothing filter circuit 6, which is configured by including an output reactor L0 and an output capacitor C0.

It is noted that the winding start of the secondary winding TF2 of the high-frequency transformer TF is connected to an anode of the rectifying diode Dr1, and a winding end of the secondary winding TF2 is connected to an anode of the rectifying diode Dr2. Respective cathodes of the rectifying diodes Dr1 and Dr2 are both connected to one end of the output reactor L0, and another end of the output reactor L0 is connected to a positive electrode of the output capacitor C0 and one end of the load resistor RU. A negative electrode of the output capacitor C0 and another end of the load resistor R are connected to the center tap of the high-frequency transformer TF. In addition, an output voltage detector unit 11 is provided to be connected in parallel to the output capacitor C0, where the output voltage detector unit 11 is provided for detecting an output voltage Vout across the output capacitor C0.

Figure 6:
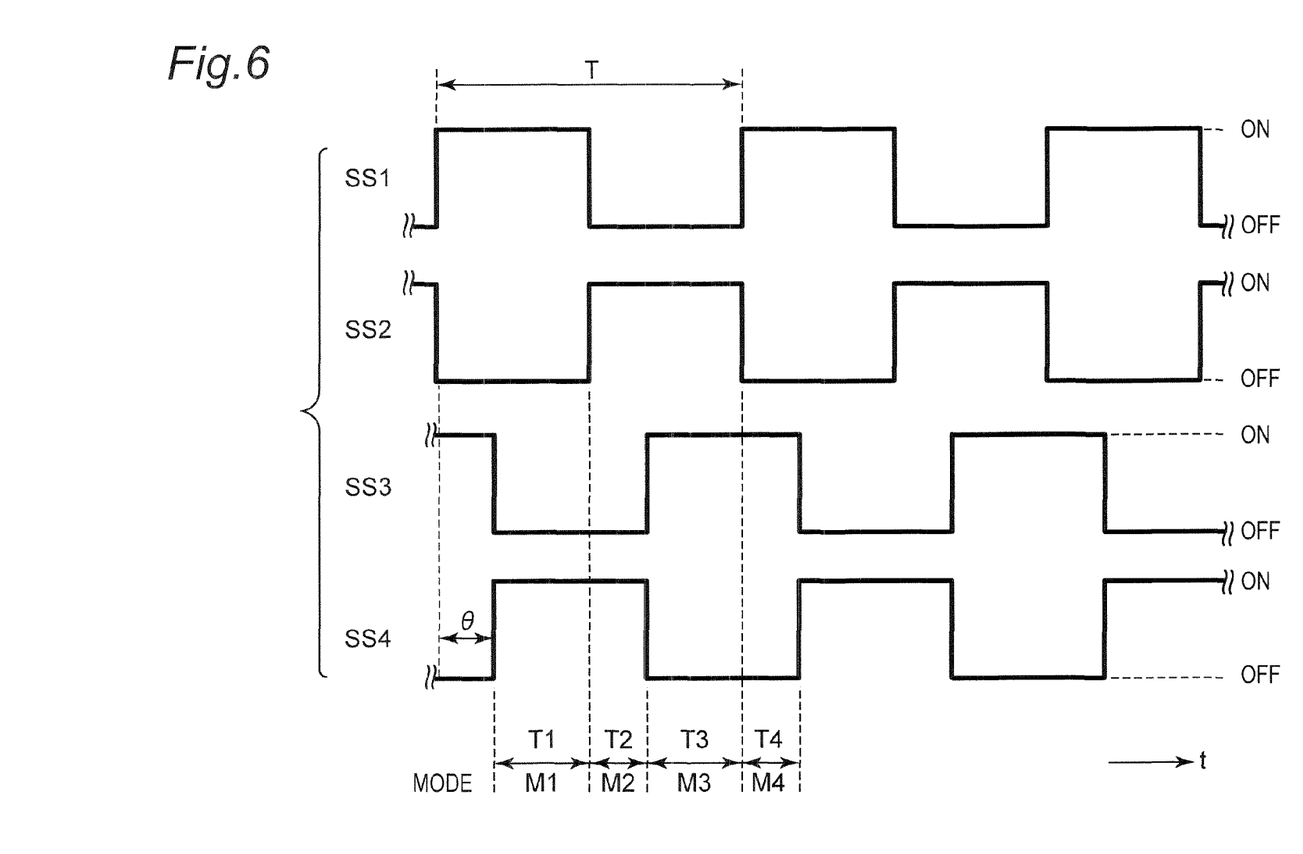
FIG. 6 is a timing chart showing operation of the phase shift DC/DC converter 5 of FIG. 5.

FIG. 6 is a timing chart showing operation of the phase shift DC/DC converter 5 of FIG. 5. Hereinafter, the operation of the phase shift DC/DC converter 5B will be described with reference to FIGS. 5 and 6. The phase shift DC/DC converter S3 according to the comparative example operates in the following four modes M1 to M4, as shown in FIG. 6.

(1) Mode M1: the switching devices S1 and S4 are turned on, and the switching devices S2 and S3 are turned off;

(2) Mode M2: the switching devices S2 and S4 are turned on, and the switching devices S1 and S3 are turned off;

(3) Mode M3: the switching devices S2 and S3 are turned on, and the switching devices S1 and S4 are turned off; and (4) Mode M4: the switching devices S1 and S3 are turned on, and the switching devices S2 and S4 are turned off.

The ON time of each of the switching devices S1 to S4 is approximately ½ of one cycle. In addition, the switching devices S1 and S2 are alternately turned on and off. In other words, when the switching device S1 is turned on, then the switching device S2 is always turned off. On the other hand, the switching device S1 is turned off, then the switching device S2 is always turned on. In a manner similar to that of above, the switching devices S3 and S4 are also alternately turned on and off. In this case, the control of the output voltage Vout is affected by changing the phase difference θ between the phase of S1 and S2 group of a reference leg and the phase of S3 and S4 group of a control leg, by shifting the latter phase. When durations of the modes M1 to M4 are denoted by T1 to T4, respectively, the following equations are establisher:

$$T1=T3 \quad (2),$$

$$T2=T4 \quad (3), \text{ and}$$

$$T=T1+T2+T3+T4=2\times(T1+T2) \quad (4).$$

When the proportion of the duration T1 to the one cycle is defined as a, the output voltage Vout is expressed by the following equation:

$$Vout=Vin(n_2/n_1)2\alpha \quad (5),$$

where $n_2/n_1$ is a turn ratio of the high-frequency transformer TF.

Subsequently, in order to explain about soft switching operation, the modes M1 to M4 will be described precisely with dividing each of the modes M1 to M4 into several sub-modes. For the purpose of illustration, first of all, the mode M1-4 is described below.

<Mode M1-4>

In this case, since the switching devices S1 and S4 are turned on, an input voltage Vin is applied to the primary winding TF1 of the high-frequency transformer TF such that the diode Dr1 is conducting, and electric power is supplied with the secondary winding TF2 of the high-frequency transformer TF. In this case, a large resonance current $I_R$ flows in the resonance coil Lre such that an energy is accumulated in the resonance coil Lre. Then the switching device S1 is turned off, and the process proceeds to the next operation mode.

<Mode M2-1>

When the switching device S1 is turned off, the capacitor C1 is charged in the following path:

E+→C1→Lre→T1→S4→E−.

At the moment of turning off the switching device S1, the voltage across the capacitor C1 is 0V, and therefore, turning off of the switching device S1 is performed by the ZVS. In parallel to the charge operation of the capacitor C1, the capacitor C2 is discharged in the following path:

C2→Lre→TF1→S4→C2.

When the charge and discharge operation of the capacitors C1 and C2 is completed, the process proceeds to the next operation mode.

<Mode M2-2>

Even if the charge and discharge operation of the capacitors C1 and C2 is completed, an energy still remains in the resonance coil Lre, and therefore, the current $I_R$ of the resonance coil Lre continues to flow in the following path:

Lre→TF1→S4→D2→Lre.

In this state, when the switching device S2 is turned on, the process proceeds to the next operation mode. At that time, since the reverse conducting diode D2 is conducting, the voltage of the switching device S2 is substantially 0V. Therefore, turning on of the switching device S2 is performed by ZVS.

<Mode M2-3>

The current $I_R$ is circulated in the following path, continuously, with the energy of the resonance coil Lre:

Lre→TF1→S4→S2→Lre.

A voltage drop of the switching devices S4 and S2 is applied to the resonance coil Lre, in the opposite direction to that of the voltage generated by the current $I_R$ of the resonance coil Lre, where the opposite direction is the direction from the high-frequency transformer TF to the inverter circuit INV. Therefore, the current $I_R$ is gradually reduced, and the energy of the current $I_R$ also decreases gradually. Then, the switching device S4 is turned off, and the process proceeds to the next operation mode.

<Mode 3M-1>

When the switching device S4 is turned off, the capacitor C4 is charged in the following path:

Lre→TF1→C4→S2→Lre.

At the moment of tuning off the switching device S4, the voltage across the capacitor C4 is 0V, and therefore, turning off of the switching device S4 is performed by the ZVS. In this case, in parallel to the charge operation of the capacitor C4, the capacitor C3 is discharged in the following path:

Lre→TF1→C3→E→S2→Lre.

When the charge and discharge operation of the capacitor C4 and C3 is completed, the process proceeds to the next operation mode. It is noted that the charge and discharge operation of the capacitor C4 and C3 is carried out with the energy of the resonance coil Lre. Therefore, in order to complete the charge and discharge operation, sufficient energy must remain in the resonance coil Lre at the beginning of the mode M3-1.

<Mode M3-2>

Even if the charge and discharge operation of the capacitor C4 and C3 is completed, an energy of the resonance coil Lre still remains, and therefore, the current $I_R$ of the resonance coil Lre continues to flow in the following path:

Lre→TF1→D3→E→S2→Lre.

In this state, when the switching device S3 is turned on, the process proceeds to the next operation mode. Since the reverse conducting diode D3 is conducting, the voltage of the switching device S3 is almost 0V. Therefore, the turning on of the switching device S3 is performed by the ZVS.

<Mode M3-3>

Continuously, the current $I_R$ flows in the following path with the energy of the resonance coil Lre:

Lre→TF1→S3→E→S2→Lre.

The input voltage Vin is applied to the resonance coil Lre in the opposite direction to that of the voltage generated by the current $I_R$ of the resonance coil Lre, where the opposite direction is the direction from the high-frequency transformer TF to the inverter circuit INV. Then the current of the resonance coil Lre is rapidly reduced, and the current is inverted immediately, then the process proceeds to the next operation mode.

<Mode M3-4>

The direction of the current $I_R$ of the resonance coil Lre is inverted from the direction of the mode M3-3, and then, the current $I_R$ flows in the following path:

E+→S3→TF1→Lre→S2→E−.

The input voltage Vin is applied to the primary winding TF1 of the high-frequency transformer TF in the negative direction, and an electric power is supplied to the secondary winding TF2 of the high-frequency transformer TF. Since the voltage of the secondary winding TF2 of the high-frequency transformer TF is negative, the diode Dr2 is conducting. Then the switching device S2 is turned off, and the process proceeds to the next mode operation.

<Mode M4-1>

When the switching device S2 is turned off, the capacitor C2 is charged in the following path:

E+→S3→TF1→Lre→C2→E−.

In this case, in parallel to the charging operation of the capacitor C2, the capacitor C1 is discharged in the following path:

C1→S3→TF1→Lre→C1.

When the charge and discharge operation of the capacitor C2 and C1 is completed, the process proceeds to the next operating mode.

<Mode M4-2>

Even if the charge and discharge operation of the capacitor C2 and C1 is completed, an energy of the resonance coil Lre still remains, the current $I_R$ of the resonance coil Lre continues to flow in the following path:

Lre→TF1→DS1→S3→Lre.

In this state, the switching device S1 is turned on, and the process proceeds to the next mode operation. In this case, since the reverse conducting diode D1 is conducting, the voltage of the switching device S1 is almost 0V. Therefore, the turning on of the switching device S1 is performed by the ZVS.

<Mode M4-3>

The current $I_R$ is circulated in the following path, continuously, with the energy of the resonance coil Lre:

Lre→winding TF1→S1→S3→Lre.

The switching device S3 is turned off, and the process proceeds to the next mode operation.

<Mode M1-1>

When the switching device S3 is turned off, the capacitor C3 is charged in the following path:

Lre→TF1→S1→C3→Lre.

At the same time as charging of the capacitor C3, the capacitor C4 is discharged in the following path:

Lre→TF1→S1→E→C4→Lre.

In this case, the charge and discharge operation of the capacitors C3 and C4 is completed, the process proceeds to the next operating mode.

<Mode M1-2>

Even if the charge and discharge operation of the capacitor C3 and C4 is completed, and energy of the resonance coil Lre still remains, and then the current $I_R$ of the resonance coil Lre continues to flow in the following path:

Lre→TF1→S1→E→D4→Lre.

In this state, the switching device S4 is turned on, and the process proceeds to the next mode operation. Since the reverse conducting diode D4 is conducting, the voltage of the switching device S4 is almost 0V. Therefore, turning on of the switching device S4 is performed by the ZVS.

<Mode M1-3>

Continuously, the current $I_R$ flowing in the energy of the resonance coil Lre in the following path:

Lre→TF1→S1→E→S4→Lre.

The input voltage Vin is applied to the resonance coil Lre in a direction that prevents the current IR from flowing. At this time, the current $I_R$ of the resonance coil Lre is rapidly reduced and inverted immediately, and the process proceeds to the mode M1-4.

In the phase shift DC/DC converter 5B according to the comparative example configured as described above, the ZVS is realized by the action of the resonance coils Lre inserted between the full-bridge inverter circuit INV and the high-frequency transformer TF. Therefore, the energy accumulated in the resonance coil Lre shall be sufficient to complete the charge and discharge operation of the capacitors C1 to C4, which are connected, respectively, in parallel to the semiconductor switching devices S1 to S4 of the inverter circuit. In this case, the energy $P_{Lre}$ accumulated in the resonance coil Lre is expressed by the following equation, in proportion to the square of the current $I_R$ flowing in the resonance coil Lre:

$$P_{Lre}=Lre \times I_R^2/2 \qquad (1)$$

It is necessary to perform conversion operation at a high efficiency and low noise even in case of a small load and a small current, in actual DC/DC converter applications. For example, in the charge application to the rechargeable battery, the operation of a wide voltage range and current range is required in accordance with the charge state of the rechargeable battery. In the phase shift DC/DC converter according to the comparative example, when the load is light and the output current decreases, the current flowing in the resonance coil Lre decreases. In this case, the soft switching operation cannot be done because enough energy cannot be accumulated to complete the charge and discharge operation of the capacitors C1 to C4. This leads to decrease in the efficiency and increase in the noise level. In order to solve the above problems in the following embodiment, we propose a phase shift DC/DC converter which is capable of preventing the inability to achieve soft switching operation in a light output load.

First Embodiment

Figure 1:
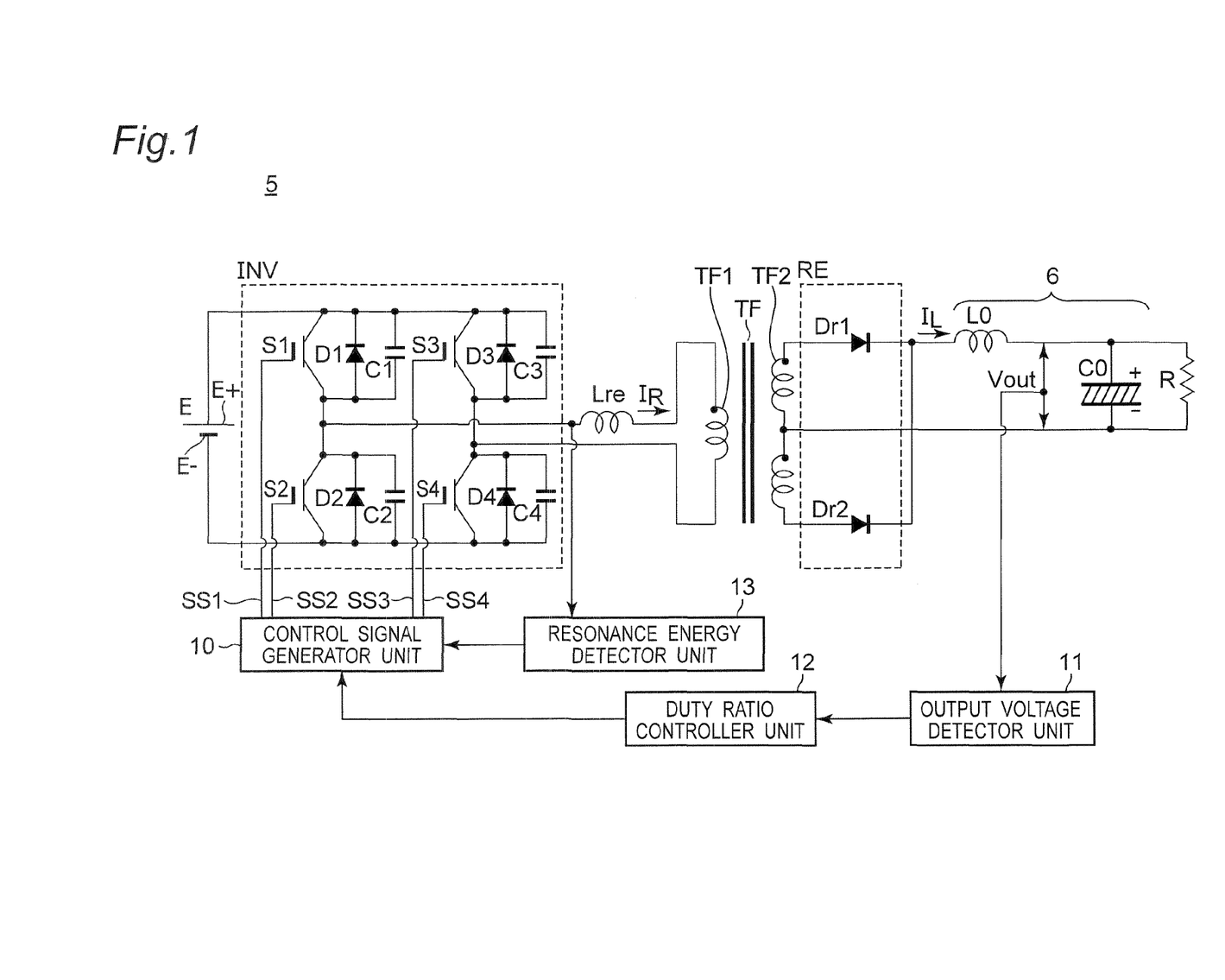
FIG. 1 is a circuit diagram showing a configuration of a switching power supply apparatus according to a first embodiment.

FIG. 1 is a circuit diagram showing a configuration of a switching power supply apparatus according to the first embodiment. The switching power supply apparatus of FIG. 1 is, for example, a phase shift DC/DC converter 5. The phase shift DC/DC converter 5 further includes a resonant energy detector unit 13 for detecting the resonance current $I_R$ in the resonance coil Lre, as compared with the phase shift DC/DC converter 5B of FIG. 5. The control signal generator unit 10 is characterized by controlling the control signals SS1 to SS4 for the switching devices S1 to S4, based on the detected resonance current $I_R$. In this case, in the DC/DC converter of soft switching system, when the current $I_R$ flowing in the resonance coil Lre decreases by the reduction of the output load current, there is provided a resonance energy detector unit 13 for detecting the same state. The detected result is fed back to the switching operation of the full bridge inverter circuit INV via the control signal generator unit 10 from the resonance energy detector unit 13, such that the switching frequency is controlled to increase the maximum value of the current flowing in the resonance coil Lre.

Figure 2:
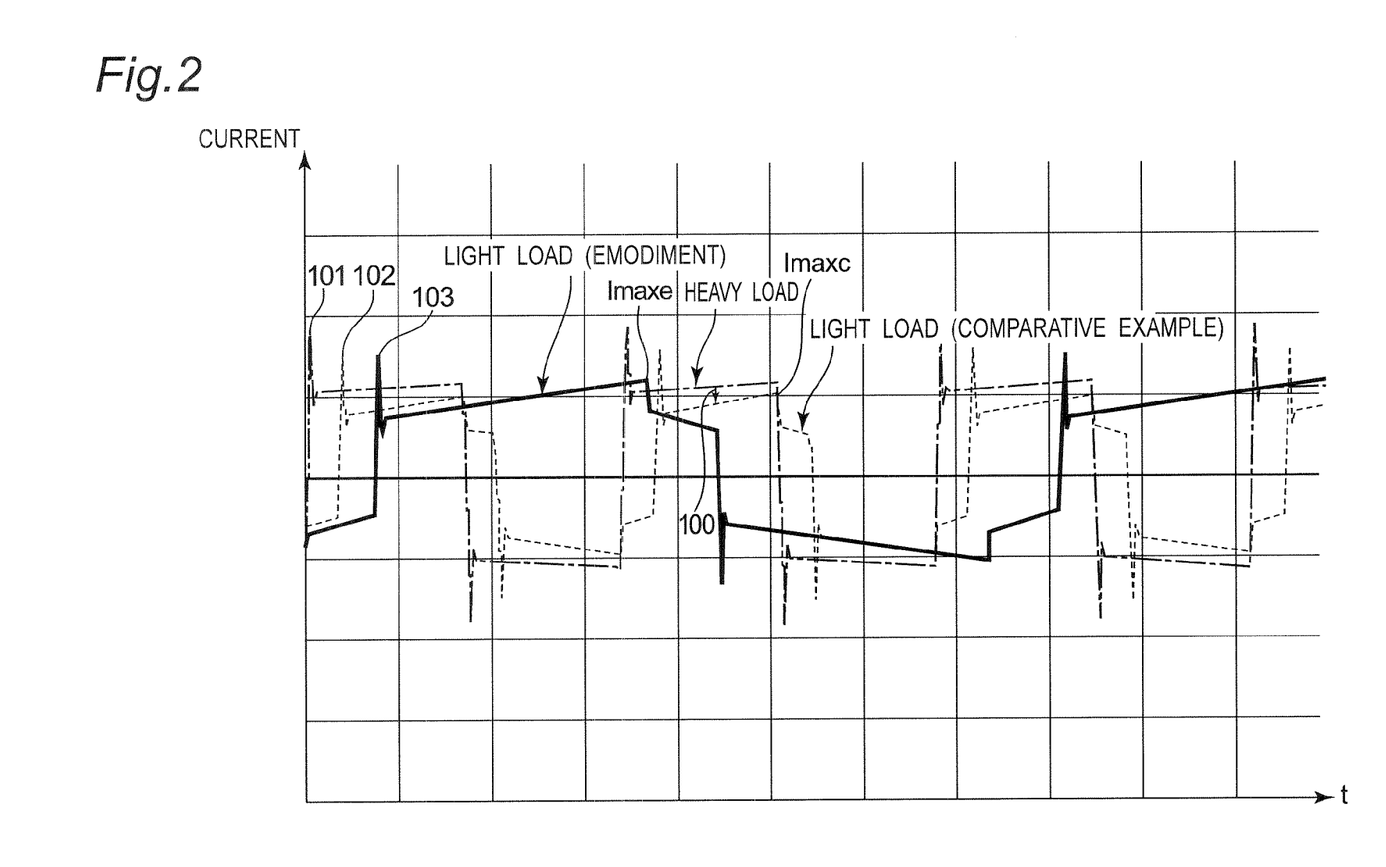
FIG. 2 is a signal waveform chart of a current $I_R$ flowing in a resonance coil Lre, showing simulation results of the switching power supply apparatus of FIG. 1 and a phase shift DC/DC converter of a comparative example.

FIG. 2 is a signal waveform chart of the current $I_R$ flowing in the resonance coil Lre, showing simulation results of the phase shift DC/DC converter 5 of FIG. 1 and a prior art phase shift DC/DC converter. The operation of the phase shift DC/DC converter 5 of FIG. 1 configured as described above will be described below with reference to FIGS. 1 and 2.

The duty ratio controller unit 12 of FIG. 1 compares the feed-back output voltage Vout from the output voltage detector unit 11 with a predetermined target voltage Vth. When the output voltage Vout is smaller than the target voltage Vth, the phase difference θ (FIG. 6) between the phase of the reference leg configured by the switching devices S1 and S2 and the phase of the control leg configured by the switching devices S3 and S4 is controlled to decrease. At that time, the current $I_R$ which is accumulated, outputted and flows in the resonance coil Lre increases as compared with the current $I_R$ before the control. On the other hand, the duty ratio controller unit 12 compares the output voltage Vout with the predetermined target voltage Vth. When the output voltage Vout is larger than the target voltage Vth, the phase difference θ (FIG. 6) between the phase of the reference leg and the phase of the control leg is controlled to increase. At that time, when the current $I_R$ flowing in the resonance coil Lre is compared with the current $I_R$ before a heavy load, the current IR decreases as indicated by an arrow 100 (See a light load of FIG. 2 of the comparative example). In other words, when the duty ratio controller unit 12 controls the duty ratio so that the output voltage Vout becomes the predetermined target voltage Vth.

In the present embodiment, when the current $I_R$ of the resonance coil Lre, which is fed back from the resonance energy detector unit 13, becomes equal to or smaller than a predetermined threshold current Ith, the control signal generator unit 10 controls the switching frequency of the control signals SS1 to SS4 to be smaller than the switching frequency of the comparative example. By lowering the switching frequency of the control signals SS1 to SS4, the maximum value Imaxe of the current $I_R$ of the resonance coil Lre becomes larger than the maximum value Imaxc the comparative example (See the light load in FIG. 2 (Embodiment)). In this case, the maximum value Imaxe or Imaxc is the maximum value immediately before switching. In other words, the control signal generator unit 10 controls the switching frequency such that the current $I_R$ detected by the resonance energy detector unit 13 becomes a predetermined threshold current Ith. It is to be noted that, when the current $I_R$ of the resonance coil Lre fed back from the resonance energy detector unit 13 exceeds the predetermined threshold, the control signal generator unit 10 stops controlling of the switching frequency of the control signals SS1 to SS4 at that frequency. In addition, it is to be noted that, in three current waveforms of FIG. 2, peak currents 101, 102 and 103 rapidly rising with overshoot represents inrush currents at the moment of turning on.

As described above, when the current or voltage of the resonance circuit detected by the resonance energy detector unit 13 becomes equal to or smaller than predetermined threshold value, the duty ratio controller unit 12 of the present embodiment controls the switching frequency of the switching devices to be lowered such that the current or voltage of the resonance circuit reaches a predetermined threshold.

Figure 9A:
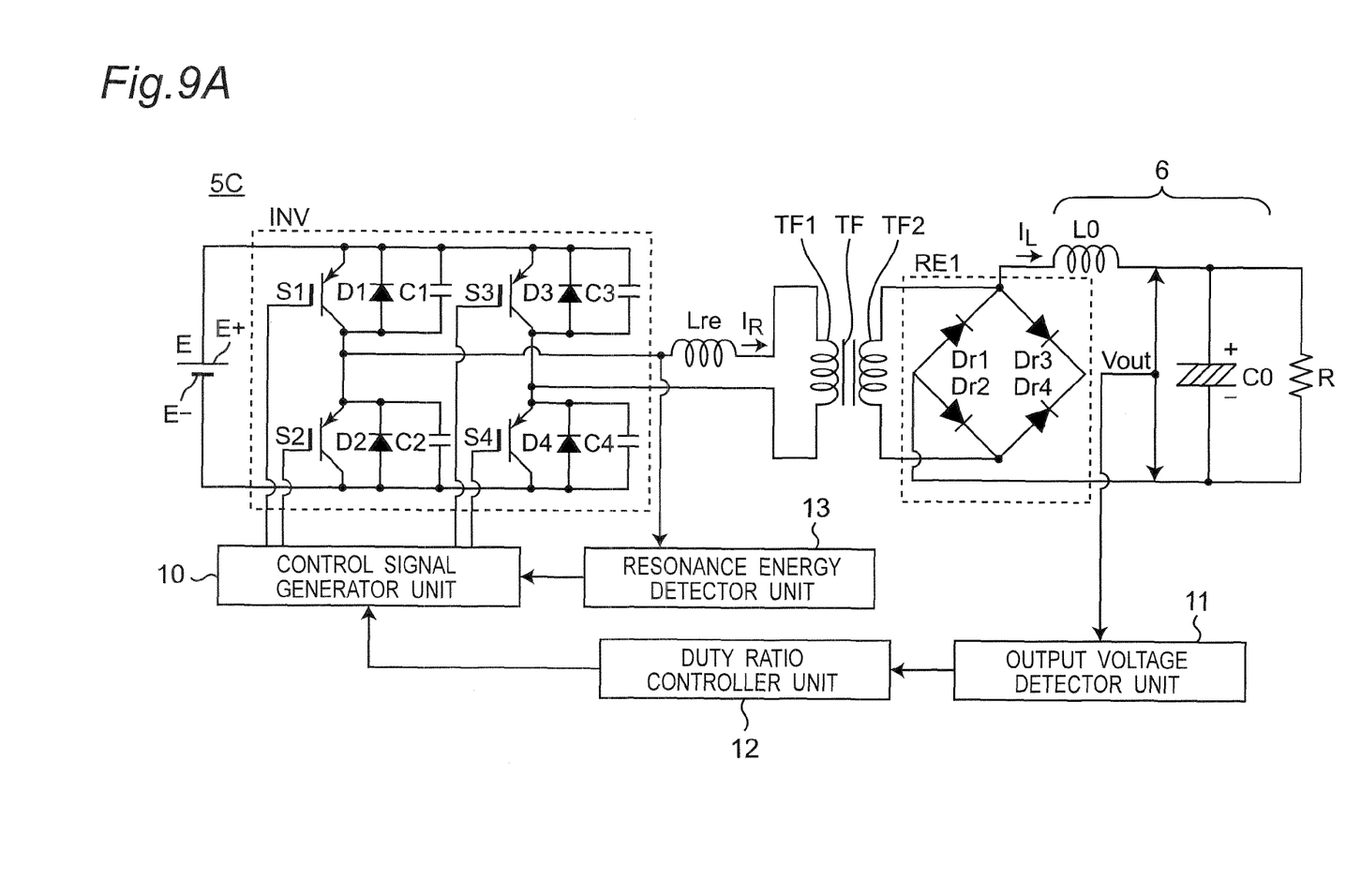
FIG. 9A is a circuit diagram showing a configuration of a switching power supply apparatus according to a modified embodiment, showing an example of a case of implementing the operation of the first embodiment.
Figure 9B:
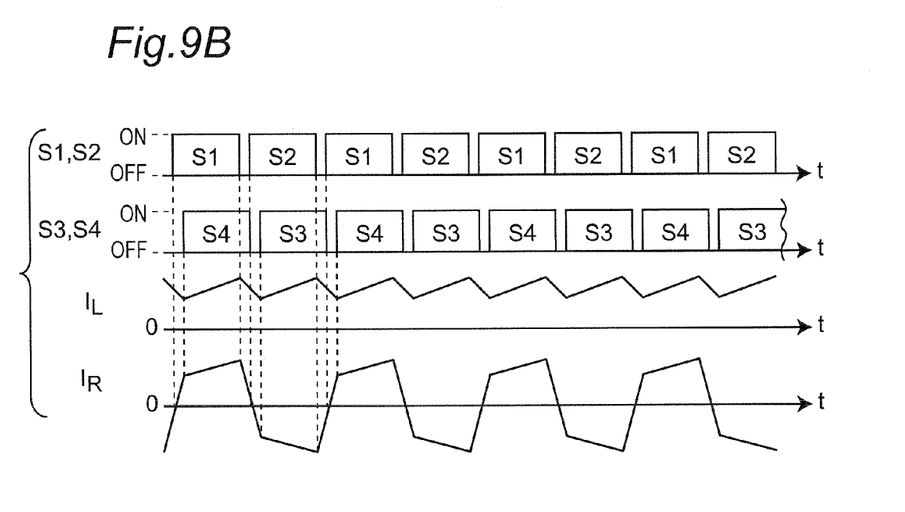
FIG. 9B is a timing chart showing a heavy load operation of the switching power supply apparatus of FIG. 9A.
Figure 9C:
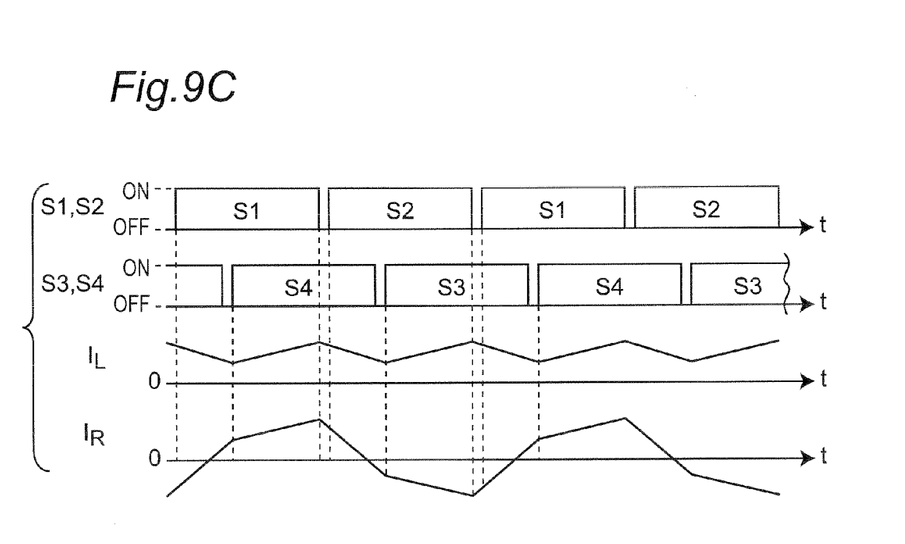
FIG. 9C is a timing chart showing a light load operation of the switching power supply apparatus of FIG. 9A.

FIG. 9A is a circuit diagram showing a configuration of a switching power supply apparatus according to a modified embodiment, showing one example of a case of implementing the operation of the first embodiment. In addition, FIG. 9B is a timing chart showing operation in a heavy load of the switching power supply apparatus of FIG. 9A. Furthermore, FIG. 9C is a timing chart showing operation in a light load of the switching power supply apparatus of FIG. 9A. FIG. 9A shows a configuration of a phase shift DC/DC converter 5C, which is configured by further including a full-wave wave rectification type rectifier RE1 having diodes Dr1 to Dr4, instead of the half-wave rectification type rectifier RE, as compared with the phase shift DC/DC converter 5 of FIG. 1.

Referring to FIGS. 9B and 9C, when the load changes, the output voltage changes. Therefore, the duty ratio controller unit 12 changes the phase shift amount in order to maintain a constant voltage. When the phase shift amount changes, the current flowing in the primary winding TF1 of the high-frequency transformer TF changes. As a result, the amount of current is reduced at a light load. The current flowing in the primary winding TF1 is detected by the resonance energy detector unit 13 which is connected in series with the switching devices. In this case, when the peak of the detected current is smaller than a predetermined current, the ratio duty controller unit 12 controls the switching period to be longer such that the peak value of the current reaches a predetermined current. By changing the switching period in response to the conduction angle, it is possible to reduce the number of switching times, and it is possible to realize the soft switching even at a light load. In the conventional configuration, in the case or the like where it is designed to be soft switching operation at the maximum output, the resonance energy becomes insufficient in operation at a light load, and it is impossible to perform the soft switching. This leads to reduction in the efficiency along with increase in the noise. On the other hand, the configuration of the present embodiment can solve this problem, and it is possible to reduce the increase in the noise and the deterioration in the efficiency.

As described above, according to the present embodiment, the switching frequency can be controlled in response to the current amount of the current $I_R$ flowing in the resonance coil Lre, and even at light-load operation, the amount of current required for the soft switching can be obtained. Therefore, according to the load state, it is possible to always maintain the soft switching condition. In addition, regardless of the state of the load, the increase in the loss due to the switching at a light load can be minimized.

In the above-mentioned embodiment, the resonance coil Lre may be configured by a leakage inductance of the high-frequency transformer TF. In addition, the resonance coil Lre may be connected in series with the secondary winding TF2 of the high-frequency transformer TF. Further, the capacitors C1 to C4 may be configured by parasitic capacitances of the switching devices S1 to S4, respectively. In addition, the reverse conducting diode D1 to D4 may be configured by parasitic diodes of the switching devices S1 to S4, respectively.

In the above-mentioned embodiment, the rectifier circuit RE is configured by the diode Dr1 and Dr2. However, the present disclosure is not limited to this, and the rectifier circuit may be configured by a full-bridge configuration circuit including four diodes.

In the above-mentioned embodiment, the resonance energy detector unit 13 detects the current $I_R$ of the resonance coils Lre. However, the present disclosure is not limited to this, and (a) a voltage generated by the resonance coil Lre, or (b) an electric power or energy based on the voltage generated by the resonance coil Lre and a current flowing in the resonance coil Lre may be detected to output the detected information to the control signal generator unit 10.

In the above-mentioned embodiment, the output voltage detector unit 11 detects the output voltage Vout, and the duty ratio control unit 12 adjusts the duty ratio of each of the control signals SS1 to SS4 for switching. However, the present disclosure is not limited to this, a current flowing in the load resistor R may be detected, and the duty ratio controller unit 12 may adjust the duty ratio of each of the control signals SS1 to SS4 for switching.

In the above-mentioned embodiment, the control signal generator unit 10 and the duty ratio controller unit 12 may be configured, respectively, by predetermined hardware circuits, or may be configured by a digital computer such as a microcomputer. The process for generating the control signals may be realized by software.

Second Embodiment

Figure 3:
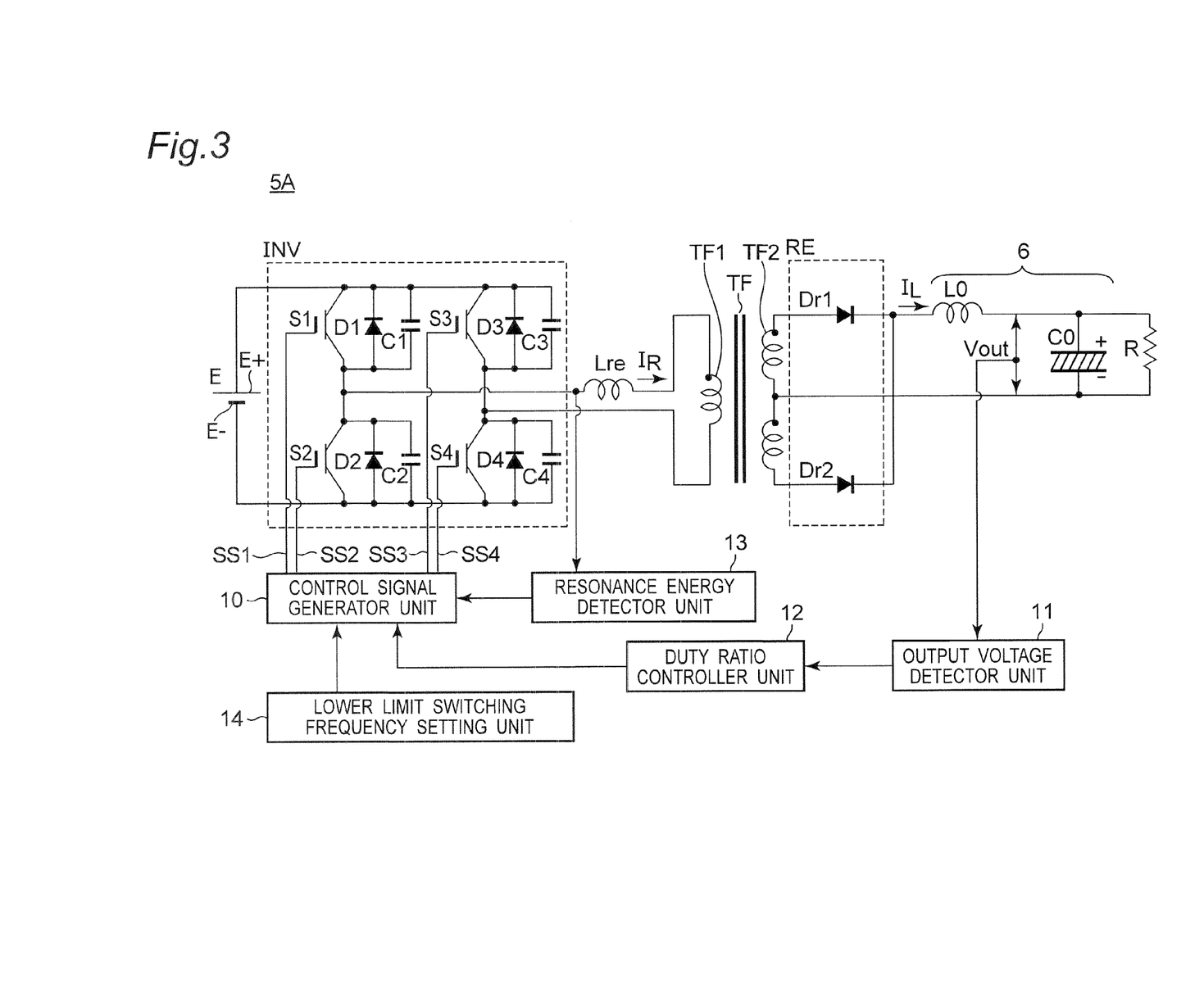
FIG. 3 is a circuit diagram showing a configuration of a phase shift DC/DC converter 5A according to a second embodiment.

FIG. 3 is a circuit diagram showing a configuration of a switching power supply apparatus according to the second embodiment. The switching power supply apparatus of FIG. 3 is, for example, a phase shift DC/DC converter 5A. The phase shift DC/DC converter 5A is characterized by further including a lower limit switching frequency setting unit 14, as compared with the phase shift DC/DC converter 5 of FIG. 1. Referring to FIG. 3, when the current $I_R$ of the resonance coil Lre fed back from the resonance energy detector unit 13 becomes equal to or smaller than the predetermined threshold current Ith, the control signal generator unit 10 controls the switching frequency of the control signals SS1 to SS4 to be lower than that of the comparative example. In this case, the lower the switching frequency setting unit 14 stores and set the lower limit of the switching frequency, for example, in a memory etc., such that the switching frequency is not lower than a threshold frequency which is an audible frequency, and outputs the lower limit of the switching frequency to the control signal generator unit 10. When the switching frequency of the control signals SS1 to SS4 is set to be lower than the switching frequency of the comparative example, the control signal generator unit 10 generates the control signals SS1 to SS4 by using the threshold frequency as a lower limit frequency.

If the switching frequency of the control signals SS1 to SS4, which are generated by the control signal generator unit 10, is lowered to be an audible frequency, an audible sound, which is so-called "sound squeal", is generated. However, according to the phase shift DC/DC converter 5A according to the present embodiment, when the switching frequency of the control signals SS1 to SS4 is made to be lower than the switching frequency of the comparative example, the control signal generator unit 10 generates the control signals SS1 to SS4, by using, as a lower limit frequency, the threshold frequency set by the lower limit switching frequency setting unit 14. Therefore, according to the present embodiment, it is possible to prevent unpleasant sounds such as audible sounds from being generated.

Third Embodiment

Figure 4:
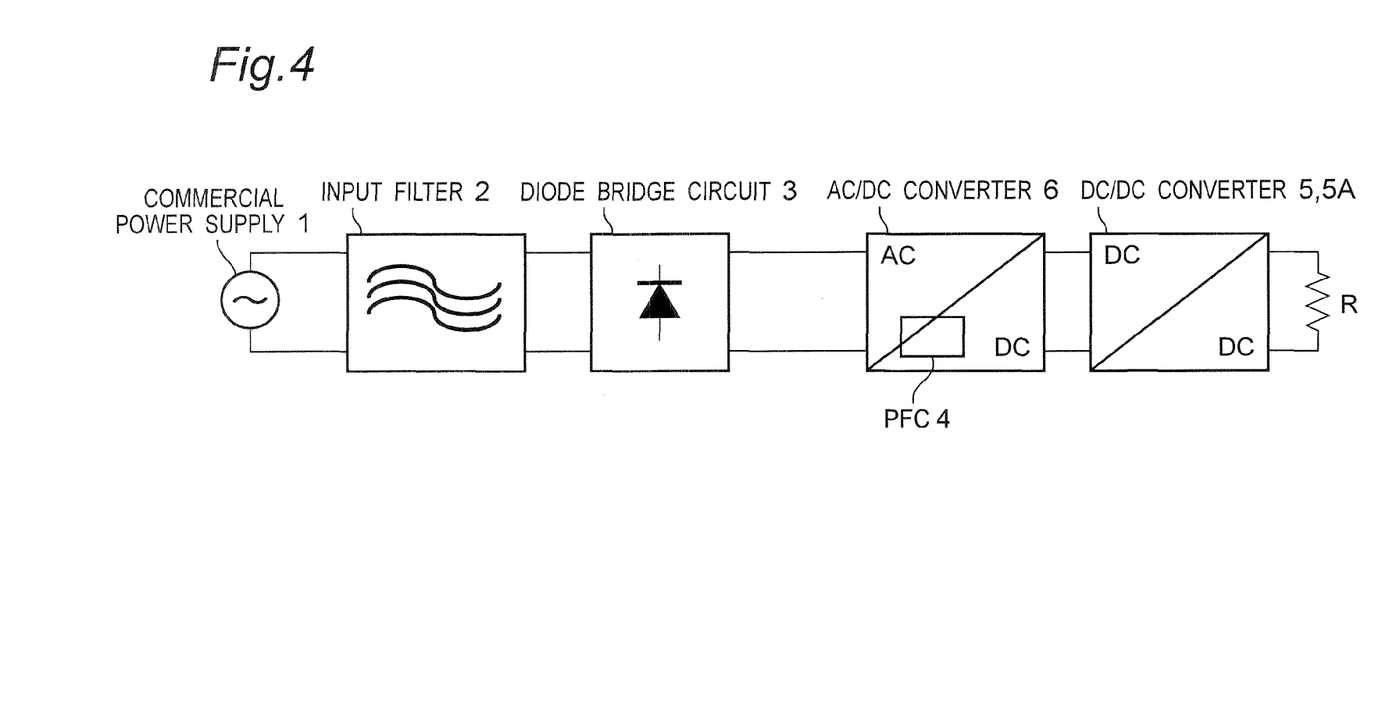
FIG. 4 is a block diagram showing a configuration of an on-vehicle charging apparatus according to a third embodiment.

FIG. 4 is a block diagram showing a configuration of an on-vehicle charging apparatus 7, according to the third embodiment. The on-vehicle charging apparatus 7 includes, for example, a switching power supply apparatus of the first or second embodiment. The on-vehicle charging apparatus 7 of FIG. 4 is configured by including an input filter 2, a diode bridge circuit 3, an AC/DC converter 6 having a power factor correction circuit (PFC) 4, and the DC/DC converter 5 or 5A.

Referring to FIG. 4, the input filter 2 band-pass-filters only a predetermined commercial power supply frequency component from the AC voltage outputted from a commercial power supply 1 to output the resulting commercial power supply frequency component to the diode bridge circuit 3. The diode bridge circuit 3 is configured by, for example, connecting four rectifying diodes in a bridge form. The diode bridge circuit 3 rectifies an input AC voltage to a pulsating voltage to output the resulting pulsating voltage to the DC/DC converter 5 or 5A through the power factor correction circuit 4 for improve the power factor of the input voltage by using a known method. The DC/DC converter 5 or 5A converts the input DC voltage to a DC voltage having a predetermined voltage to output the resulting DC voltage to the resistive load R. In the case of charging from the DC power supply, it is possible to omit the AC/DC converter 6.

According to the present embodiment configured as described above, the present embodiment has action and effects similar to those of the first or second embodiment, and can charge for the automobiles with a higher efficiency while suppressing the influence of noise on automobiles.

Fourth Embodiment

Figure 7:
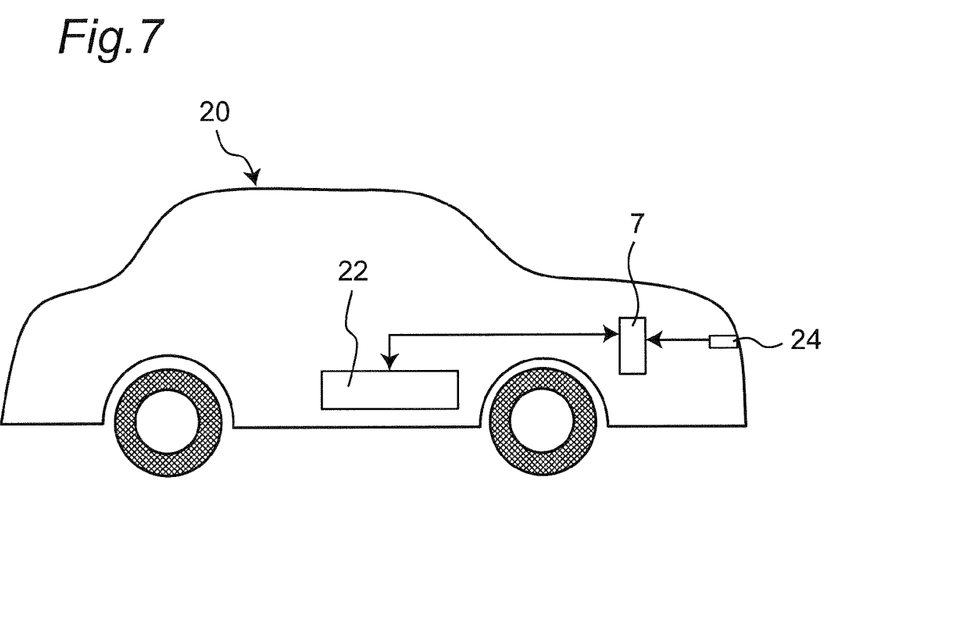
FIG. 7 is a block diagram showing a configuration of a vehicle according to a fourth embodiment.

FIG. 7 is a block diagram showing a configuration of a vehicle 20 according to the fourth embodiment. The vehicle 20 is, for example, an electric-powered vehicle or a plug-in hybrid vehicle. The vehicle 20 is provided with receptacle outlets 24 for connection to an external commercial power supply, the on-vehicle charging apparatus 7 of the third embodiment, and a rechargeable battery 22. The electric power supplied from the outlets 24 is accumulated in the rechargeable battery 22 via the on-vehicle charging apparatus 7. Thus, the vehicle 20 of the present embodiment can carried out charging with a higher efficiency and a low noise.

Fifth Embodiment

Figure 8:
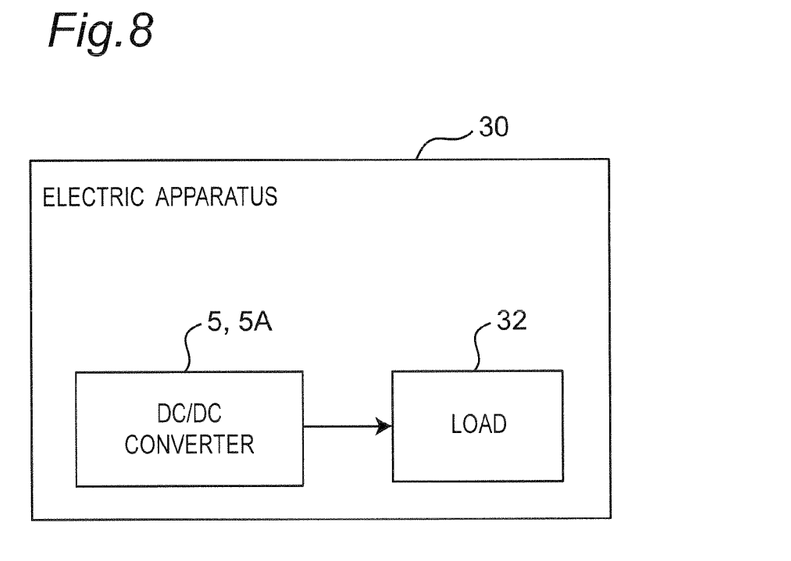
FIG. 8 is a block diagram showing a configuration of an electronic apparatus according to a fifth embodiment.

FIG. 8 is a block diagram showing a configuration of an electronic apparatus 30 according to the fifth embodiment. The electronic apparatus 30 is a personal computer, a server apparatus, or the like. The electronic apparatus 30 includes the phase shift DC/DC converter 5 or 5A which is the switching power supply apparatus of the first or second embodiment, and a load 32. The electric power outputted from the phase shift DC/DC converter 5 or 5A is supplied to the load 32. Thus, the electronic apparatus 30 of the present embodiment can operate with a low noise and a higher efficiency.

SUMMARY OF THE EMBODIMENTS

According to a switching power supply apparatus of the first aspect, the switching power supply apparatus includes an DC/AC converter unit, a transformer, a resonance circuit, a resonance circuit, an AC/DC converter circuit, an output detector unit, a duty ratio controller unit, an energy detector unit, and a controller. The DC/AC converter unit is configured to convert a DC voltage to an AC voltage based on switching operation of switching devices, and the transformer is configured to convert the AC voltage to an AC voltage having a predetermined voltage value. The resonance circuit is provided between the DC/AC converter unit and the transformer, and the AC/DC converter circuit is configured to convert an AC voltage from the transformer to a DC. The output detector unit is configured to detect an output voltage or an output current of the switching power supply apparatus, and the duty ratio controller unit is configured to control a duty ratio of switching of the switching power supply apparatus such that a detected output voltage or a detected output current becomes a predetermined target value. The energy detector unit is configured to detect an energy accumulated in the resonance circuit, and the controller unit is configured to control a switching frequency of the switching power supply apparatus such that a detected energy becomes a predetermined threshold value. The controller unit controls a switching frequency of the switching devices to lower the switching frequency such that the current or the voltage of the resonance circuit reaches the threshold value when the current or the voltage detected by the energy detector unit becomes equal to or smaller than a predetermined threshold value.

According to a switching power supply apparatus of the second aspect, in the switching power supply apparatus of the first aspect, the switching power supply apparatus further includes a setting unit configured to set a predetermined lower limit value of the switching frequency of the switching power supply apparatus. Upon controlling the switching frequency of the switching power supply apparatus such that the detected energy reaches the threshold value, when the switching frequency becomes the set lower limit value, the controller unit stops the control.

According to an on-vehicle charging apparatus of the third aspect, the on-vehicle charging apparatus includes the switching power supply apparatus of the first or second aspect.

According to a vehicle of the fourth aspect, the vehicle includes the on-vehicle charging apparatus of the third aspect, and a rechargeable battery.

According to an electrical apparatus of the fifth aspect, the electrical apparatus includes the switching power supply apparatus of the first or second aspect.

According to an electric apparatus of the sixth aspect, the electric apparatus includes the switching power supply apparatus of the first or second aspect.

INDUSTRIAL APPLICABILITY

The switching power supply according to the present disclosure can be utilized to switching power supply apparatuses etc. for use in, for example, an electrical apparatus, an electric apparatus etc.

The invention claimed is:

1. A switching power supply apparatus comprising:
   an DC/AC converter unit including switching devices, the DC/AC converter unit converting a DC voltage to an AC voltage based on switching operation of switching devices;
   a transformer configured to convert the AC voltage outputted from the DC/AC converter unit to an AC voltage having a predetermined voltage value;

a resonance circuit provided between the DC/AC converter unit and the transformer;
an AC/DC converter circuit configured to convert an AC voltage from the transformer to a DC voltage;
an output detector unit configured to detect an output voltage or an output current outputted from the AC/DC converter circuit;
a duty ratio controller unit configured to control a duty ratio of switching operations of the switching devices, based on a value of an output voltage or an output current detected by the output detector unit;
a resonance energy detector unit configured to detect a current or a voltage of the resonance circuit;
a control signal generator unit configured to generate control signals for controlling the switching operations of the switching devices, based on a value of the current or the voltage detected by the resonance energy detector unit, and the duty ratio controlled by the duty ratio controller unit; and
a setting unit configured to set a predetermined lower limit value of the switching frequency of the switching devices,
wherein, upon generating the control signals for lowering the switching frequency of the switching devices, the control signal generator unit stops control of lowering the switching frequency of the switching devices when the switching frequency becomes the lower limit value, and generates such control signals that the switching frequency of the switching devices becomes the lower limit value,
the control signals, for allowing the switching devices to perform such switching operations that the value of the output voltage or the output current detected by the output detector unit becomes a predetermined target value, are generated, by controlling the duty ratio of the switching operations of the switching devices by the duty ratio controller unit, and
the control signal generator unit generates the control signals for lowering the switching frequency of the switching devices when the value of the current or voltage detected by the resonance energy detector unit becomes equal to or smaller than a predetermined threshold value, thereby allowing the switching devices to perform such switching operations that the value of the current or voltage of the resonance circuit reaches the predetermined threshold value.

2. An on-vehicle charging apparatus comprising a switching power supply apparatus,
wherein the switching power supply apparatus comprises:
an DC/AC converter unit including switching devices, the DC/AC converter unit converting a DC voltage to an AC voltage based on switching operation of switching devices;
a transformer configured to convert the AC voltage outputted from the DC/AC converter unit to an AC voltage having a predetermined voltage value;
a resonance circuit provided between the DC/AC converter unit and the transformer;
an AC/DC converter circuit configured to convert an AC voltage from the transformer to a DC voltage;
an output detector unit configured to detect an output voltage or an output current outputted from the AC/DC converter circuit;
a duty ratio controller unit configured to control a duty ratio of switching operations of the switching devices, based on a value of an output voltage or an output current detected by the output detector unit;
a resonance energy detector unit configured to detect a current or a voltage of the resonance circuit;
a control signal generator unit configured to generate control signals for controlling the switching operations of the switching devices, based on a value of the current or the voltage detected by the resonance energy detector unit, and the duty ratio controlled by the duty ratio controller unit; and
a setting unit configured to set a predetermined lower limit value of the switching frequency of the switching devices,
wherein, upon generating the control signals for lowering the switching frequency of the switching devices, the control signal generator unit stops control of lowering the switching frequency of the switching devices when the switching frequency becomes the lower limit value, and generates such control signals that the switching frequency of the switching devices becomes the lower limit value,
the control signals, for allowing the switching devices to perform such switching operations that the value of the output voltage or the output current detected by the output detector unit becomes a predetermined target value, are generated by controlling the duty ratio of the switching operations of the switching devices by the duty ratio controller unit, and
the control signal generator unit generates the control signals for lowering the switching frequency of the switching devices when the value of the current or voltage detected by the resonance energy detector unit becomes equal to or smaller than a predetermined threshold value, thereby allowing the switching devices to perform such switching operation that the value of the current or voltage of the resonance circuit reaches the predetermined threshold value.

3. A vehicle comprising an on-vehicle charging apparatus; and
a rechargeable battery,
wherein the charging apparatus comprises a switching power supply apparatus,
wherein the switching power supply apparatus comprises:
an DC/AC converter unit including switching devices, the DC/AC converter unit converting an AC voltage to a DC voltage based on switching operation of switching devices;
a transformer configured to convert the AC voltage outputted from the DC/AC converter unit to an AC voltage having a predetermined voltage value;
a resonance circuit provided between the DC/AC converter unit and the transformer;
an AC/DC converter circuit configured to convert an AC voltage from the transformer to a DC voltage;
an output detector unit configured to detect an output voltage or output current outputted from the AC/DC converter circuit;
a duty ratio controller unit configured to control a duty ratio of switching operation of the switching devices, based on a value of an output voltage or an output current detected by the output detector unit;
a resonance energy detector unit configured to detect a current or a voltage of the resonance circuit;
a control signal generator unit configured to generate a control signal for controlling the switching operation of the switching devices, based on a value of the current or the voltage detected by the resonance energy detector unit, and the duty ratio controlled by the duty ratio controller unit; and a setting unit configured to set a predetermined lower limit value of the switching frequency of the switching devices, wherein, upon generating the control signals for lowering the switching frequency of the switching devices, the control signal generator unit stops control of lowering the switching frequency of the switching devices when the switching frequency becomes the lower limit value, and generates such control signals that the switching frequency of the switching devices becomes the lower limit value, the control signal, for allowing the switching devices to perform such switching operation that the value of the output voltage or the output current detected by the output detector unit becomes a predetermined target value, is generated by controlling the duty ratio of the switching operation of the switching devices by the duty ratio controller unit, and the control signal generator unit generates the control signal for lowering the switching frequency of the switching devices when the value of the current or voltage detected by the resonance energy detector unit becomes equal to or smaller than a predetermined threshold value, thereby allowing the switching devices to perform such switching operation that the value of the current or voltage of the resonance circuit reaches the predetermined threshold value.

4. An electrical apparatus comprising a switching power supply apparatus, wherein the switching power supply apparatus comprises:

an DC/AC converter unit including switching devices, the DC/AC converter unit converting an AC voltage to a DC voltage based on switching operation of switching devices;

a transformer configured to convert the AC voltage outputted from the DC/AC converter unit to an AC voltage having a predetermined voltage value;

a resonance circuit provided between the DC/AC converter unit and the transformer;

an AC/DC converter circuit configured to convert an AC voltage from the transformer to a DC voltage;

an output detector unit configured to detect an output voltage or output current outputted from the AC/DC converter circuit;

a duty ratio controller unit configured to control a duty ratio of switching operation of the switching devices, based on a value of an output voltage or an output current detected by the output detector unit;

a resonance energy detector unit configured to detect a current or a voltage of the resonance circuit;

a control signal generator unit configured to generate a control signal for controlling the switching operation of the switching devices, based on a value of the current or the voltage detected by the resonance energy detector unit, and the duty ratio controlled by the duty ratio controller unit; and a setting unit configured to set a predetermined lower limit value of the switching frequency of the switching devices, wherein, upon generating the control signals for lowering the switching frequency of the switching devices, the control signal generator unit stops control of lowering the switching frequency of the switching devices when the switching frequency becomes the lower limit value, and generates such control signals that the switching frequency of the switching devices becomes the lower limit value, the control signal, for allowing the switching devices to perform such switching operation that the value of the output voltage or the output current detected by the output detector unit becomes a predetermined target value, is generated by controlling the duty ratio of the switching operation of the switching devices by the duty ratio controller unit, and the control signal generator unit generates the control signal for lowering the switching frequency of the switching devices when the value of the current or voltage detected by the resonance energy detector unit becomes equal to or smaller than a predetermined threshold value, thereby allowing the switching devices to perform such switching operation that the value of the current or voltage of the resonance circuit reaches the predetermined threshold value.

5. An electric apparatus comprising a switching power supply apparatus, wherein the switching power supply apparatus comprises:

an DC/AC converter unit including switching devices, the DC/AC converter unit converting an AC voltage to a DC voltage based on switching operation of switching devices;

a transformer configured to convert the AC voltage outputted from the DC/AC converter unit to an AC voltage having a predetermined voltage value;

a resonance circuit provided between the DC/AC converter unit and the transformer;

an AC/DC converter circuit configured to convert an AC voltage from the transformer to a DC voltage;

an output detector unit configured to detect an output voltage or output current outputted from the AC/DC converter circuit;

a duty ratio controller unit configured to control a duty ratio of switching operation of the switching devices, based on a value of an output voltage or an output current detected by the output detector unit;

a resonance energy detector unit configured to detect a current or a voltage of the resonance circuit;

a control signal generator unit configured to generate a control signal for controlling the switching operation of the switching devices, based on a value of the current or the voltage detected by the resonance energy detector unit, and the duty ratio controlled by the duty ratio controller unit; and a setting unit configured to set a predetermined lower limit value of the switching frequency of the switching devices, wherein, upon generating the control signals for lowering the switching frequency of the switching devices, the control signal generator unit stops control of lowering the switching frequency of the switching devices when the switching frequency becomes the lower limit value, and generates such control signals that the switching frequency of the switching devices becomes the lower limit value, the control signal, for allowing the switching devices to perform such switching operation that the value of the output voltage or the output current detected by the output detector unit becomes a predetermined target value, is generated by controlling the duty ratio of the switching operation of the switching devices by the duty ratio controller unit, and the control signal generator unit generates the control signal for lowering the switching frequency of the switching devices when the value of the current or voltage detected by the resonance energy detector unit becomes equal to or smaller than a predetermined threshold value, thereby allowing the switching devices to perform such switching operation that the value of the current or voltage of the resonance circuit reaches the predetermined threshold value.

\* \* \* \* \*